(12) United States Patent
Kitahara

(10) Patent No.: US 8,749,883 B2
(45) Date of Patent: Jun. 10, 2014

(54) INVERTED MICROSCOPE

(71) Applicant: Olympus Corporation, Tokyo (JP)

(72) Inventor: Akihiro Kitahara, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/683,237

(22) Filed: Nov. 21, 2012

(65) Prior Publication Data

US 2013/0075578 A1  Mar. 28, 2013

Related U.S. Application Data (63) Continuation of application No. PCT/JP2011/062287, filed on May 27, 2011.

(30) Foreign Application Priority Data

May 28, 2010 (JP) ................................. 2010-123440

(51) Int. Cl.
  *G02B 21/26* (2006.01)
(52) U.S. Cl.
  USPC ........................... 359/391; 359/368; 359/385
(58) Field of Classification Search
  USPC ................... 359/368, 379, 391, 392
  See application file for complete search history.

(56) References Cited

U.S. PATENT DOCUMENTS

| | | | | |
|---|---|---|---|---|
| 6,160,662 A * | 12/2000 | Uchida et al. | ................. | 359/390 |
| 6,239,905 B1 * | 5/2001 | Toyoda et al. | ................. | 359/392 |
| 6,404,546 B2 * | 6/2002 | Toyoda et al. | ................. | 359/392 |
| 6,791,767 B2 * | 9/2004 | Bonaventura | ................. | 359/819 |
| 8,027,084 B2 * | 9/2011 | Hasegawa | ..................... | 359/368 |
| 2002/0036823 A1 | 3/2002 | Shimada et al. | | |
| 2002/0131165 A1 * | 9/2002 | Takahama | ..................... | 359/381 |
| 2002/0171925 A1 * | 11/2002 | Tonooka et al. | ................. | 359/381 |
| 2003/0107800 A1 * | 6/2003 | Doering et al. | ................. | 359/388 |
| 2004/0125439 A1 * | 7/2004 | Euteneuer et al. | ............ | 359/368 |
| 2005/0099679 A1 * | 5/2005 | Kleinteich et al. | ............ | 359/368 |
| 2006/0066942 A1 * | 3/2006 | Kouno et al. | .................. | 359/368 |
| 2007/0146872 A1 * | 6/2007 | Bocher et al. | .................. | 359/386 |
| 2008/0199929 A1 * | 8/2008 | Yeung | ......................... | 435/173.1 |
| 2010/0302628 A1 * | 12/2010 | Murayama et al. | ........... | 359/372 |

FOREIGN PATENT DOCUMENTS

| | | |
|---|---|---|
| JP | 08-043741 A | 2/1996 |
| JP | 11-072715 A | 3/1999 |
| JP | 11-344675 A | 12/1999 |
| JP | 2002-169101 A | 6/2002 |
| JP | 2006-091571 A | 4/2006 |
| JP | 2006-091723 A | 4/2006 |

OTHER PUBLICATIONS

International Search Report (ISR) dated Sep. 13, 2011 (and English translation thereof) issued in parent International Application No. PCT/JP2011/062287.

* cited by examiner

*Primary Examiner* — Frank Font
(74) *Attorney, Agent, or Firm* — Holtz Holtz Goodman & Chick PC (57) ABSTRACT

An inverted microscope includes: a microscope main body; a stage that is supported by the microscope main body; and an observation optical system that allows observing a sample placed on the stage from underneath, the microscope main body, in which an optical device can be attached between an objective lens and a tube lens which constitute the observation optical system including a plurality of stage supporting parts that support the stage; and a beam part that connects, in a manner of locating between the tube lens and the objective lens, at least a pair of stage supporting parts at front and back sides together among the plurality of stage supporting parts.

18 Claims, 10 Drawing Sheets

INVERTED MICROSCOPE

CROSS-REFERENCE TO RELATED APPLICATION

This application is a continuation of International Application No. PCT/JP2011/062287 designating the United States and filed on May 27, 2011 which claims the benefit of priority of the prior Japanese Patent Application No. 2010-123440, filed on May 28, 2010, and the entire contents of the International application and the Japanese Application are incorporated herein by reference.

BACKGROUND OF THE INVENTION

1. Field of the Invention

The present invention relates to an inverted microscope that allows observing a sample as an observation target from underneath.

2. Description of the Related Art

An inverted microscope to which an optical device constituting a new optical system between an objective lens and a tube lens can be attached has been proposed. To enable the attachment of the optical device between the objective lens and the tube lens, this inverted microscope is configured so that a spacer member can be arranged between a stage and a stage supporting member that supports the stage. By selecting and arranging a spacer member corresponding to a thickness of the optical device to be newly attached, a level of the stage is raised and the new optical device is attached between the objective lens and the tube lens through the use of a space provided by the leveling. More detailed information of the technique is obtained in Japanese Patent Application Laid-Open No. H11-72715, for example.

Besides, there has been proposed another inverted microscope provided with a stage unit that is formed by unitizing a stage and an objective lens, a microscope main body to which the stage unit can be detachably attached, and an optical device which can be attached between the microscope main body and the stage unit and by which a height of the stage is changed when attached. More detailed information of the technique is obtained in Japanese Patent Application Laid-Open No. H11-344675, for example.

SUMMARY OF THE INVENTION

According to an aspect of the present invention, an inverted microscope includes a microscope main body; a stage that is supported by the microscope main body; and an observation optical system that allows observing a sample placed on the stage from underneath, the microscope main body, in which an optical device can be attached between an objective lens and a tube lens which constitute the observation optical system including a plurality of stage supporting parts that support the stage; and a beam part that connects, in a manner of locating between the tube lens and the objective lens, at least a pair of stage supporting parts at front and back sides together among the plurality of stage supporting parts.

The above and other features, advantages, and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an inverted microscope according to the present invention will be explained in detail below with reference to the accompanying drawings. It should be noted that the present invention is not limited to the embodiments.

First Embodiment

Figure 1:
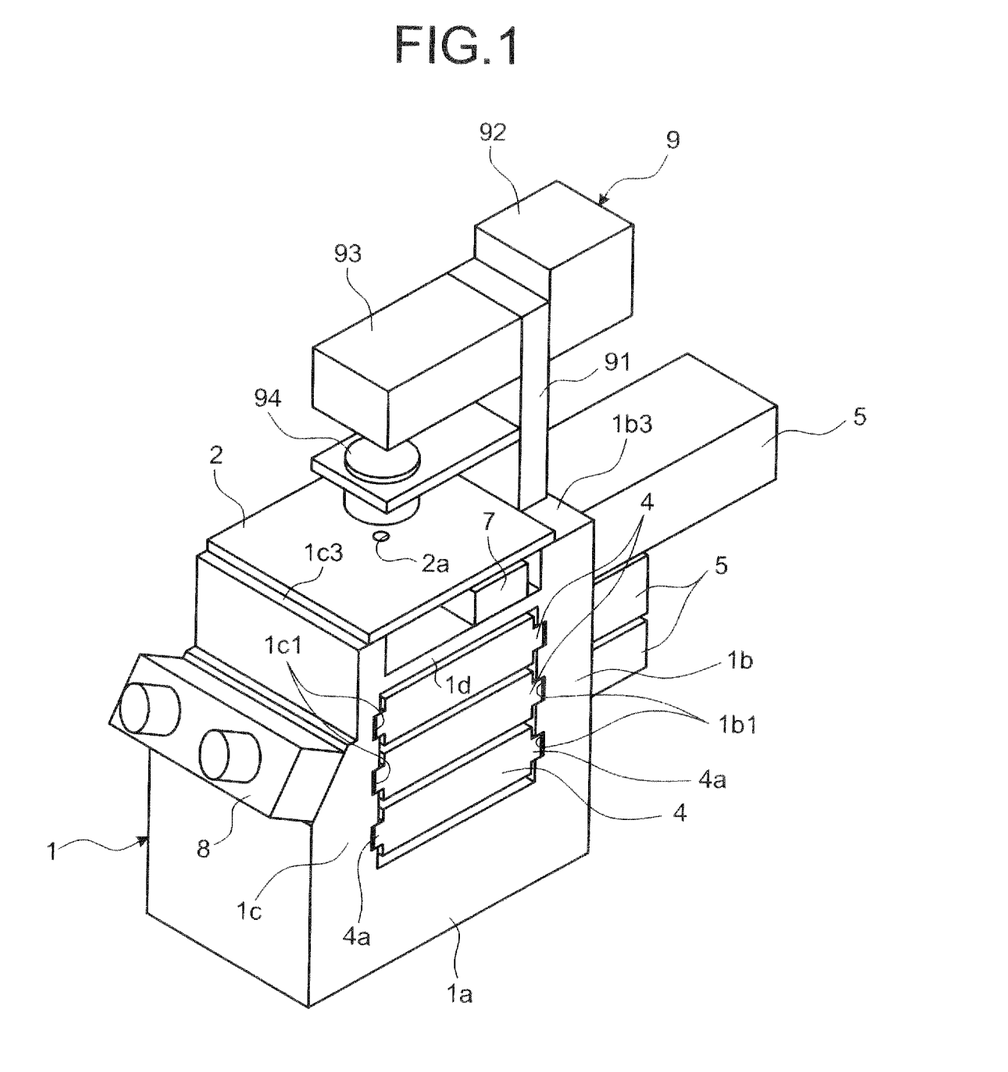
FIG. 1 is a conceptual perspective view of an inverted microscope according to a first embodiment of the present invention.
Figure 2:
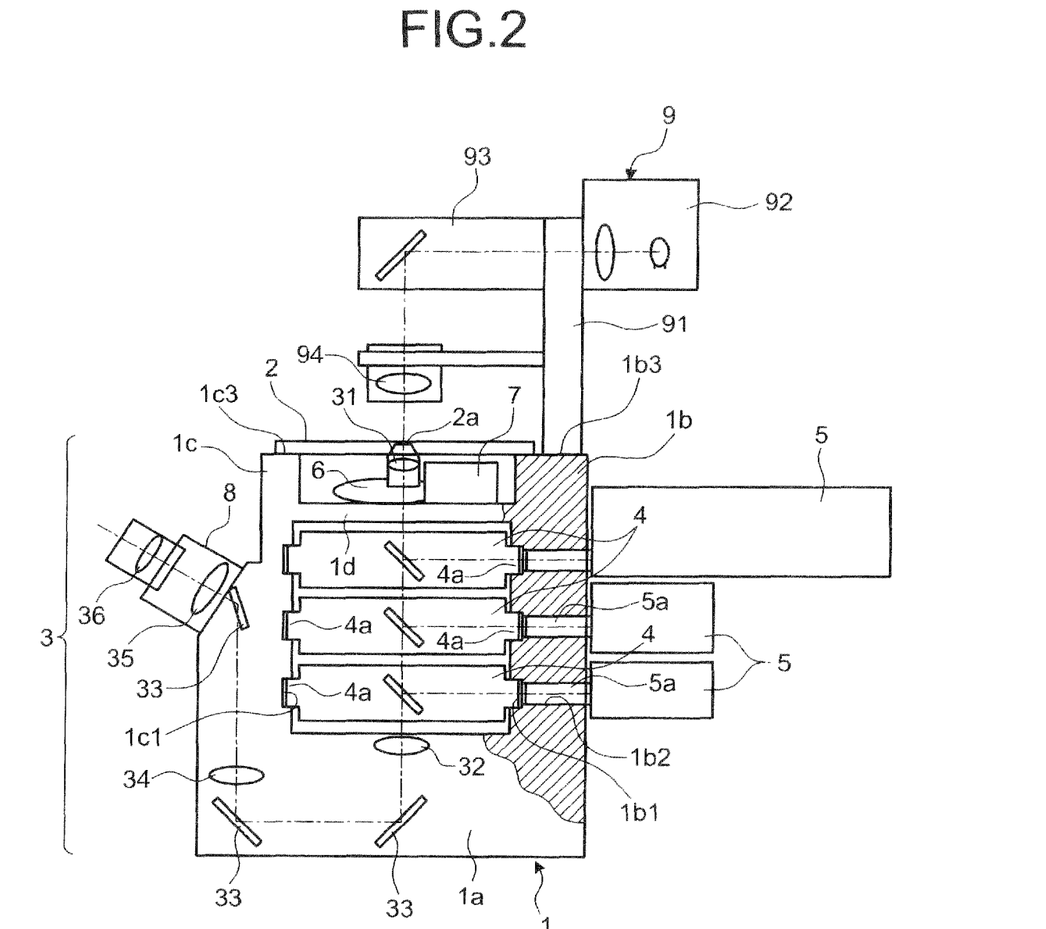
FIG. 2 is a cross sectional view of an inner structure of the inverted microscope shown in FIG. 1.

FIG. 1 is a conceptual perspective view of an inverted microscope according to a first embodiment of the present invention and FIG. 2 is a cross sectional view of an inner structure of the inverted microscope shown in FIG. 1.

As shown in FIGS. 1 and 2, the inverted microscope is a microscope that allows observing a sample as an observation target from underneath and is provided with a microscope main body 1, a stage 2 that is supported in the microscope main body 1, and an observation optical system 3 that allows observing a sample placed on the stage 2 from underneath.

The microscope main body 1 has a box shape and is provided with a base part 1a that extends in a front-back direction, a back wall part 1b that extends upward from a back edge part of the base part 1a, a front wall part 1c that extends upward from a front edge part of the base part 1a, and a beam part 1d that connects an upper part of the back wall part 1b and an upper part of the front wall part 1c together. An attachment area of an optical device 4 is formed in a lower side area of the beam part 1d and an attachment area of an objective lens 31 (see FIG. 2) is formed in an upper side area thereof.

In an inner side of the back wall part 1b and an inner side of the front wall part 1c forming the attachment area, three pairs of fitting groves 1b1 and 1c1 provided at front and back sides are formed along the vertical direction. The fitting grooves 1b1 and 1c1 in pairs, to which a convex part 4a which has a prismatic column shape and is provided in the optical device 4 can be fitted, allow attaching the optical device 4 and extend in the horizontal direction. The convex part 4a provided in the optical device 4 is guided to the fitting grooves 1b1 and 1c1 and the optical device 4 is attached to the microscope main body 1. The attached optical device 4 is then positioned by the convex part 4a and the fitting grooves 1b1 and 1c1 and fixed.

As shown in FIG. 2, fitting holes 1b2 that are in communication with the respective three fitting grooves 1b1 are formed collaterally along the vertical direction in the back wall part 1b. The fitting hole 1b2, to which a columnar convex part 5a provided in a light source 5 can be fitted, allows attaching the light source 5. The convex part 5a provided in the light source 5 is guided to the fitting hole 1b2 and the light source 5 is attached to the microscope main body 1. The attached light source 5 is then positioned by the convex part 5a and the fitting hole 1b2 and fixed.

On an upper surface of the beam part 1d forming the attachment area, a revolver 6 and a focusing device 7 are attached. The revolver 6, to which a plurality of objective lenses 31 can be attached, is capable of revolving and moving up and down. Then, one of the objective lenses 31 attached to the revolver 6 is placed on the optical axis. The focusing device 7 serves to focus the objective lens 31 on the sample and the objective lens 31 attached to the revolver 6 is focused on the sample when the revolver 6 moves down in response to the operation of the focusing device 7.

As shown in FIGS. 1 and 2, an upper surface 1b3 of the back wall part 1b and an upper surface 1c3 of the front wall part 1c form the same planar surface running in the horizontal direction, and the stage 2 is attached over and supported by the upper surface 1b3 of the back wall part 1b and the upper surface 1c3 of the front wall part 1c.

The stage 2 has a plate like body whose upper surface and lower surface are flat and the sample is placed on the upper surface. Besides, an opening (open hole) 2a whose size is small enough not to allow the sample to drop therethrough is provided approximately at a center of the stage 2, enabling an observation light to pass through.

As shown in FIG. 2, the observation optical system 3 enables observing the sample and is provided over the course from the microscope main body 1 to a lens-barrel 8 attached to the microscope main body 1. The observation optical system 3 is provided with, other than the objective lens 31 explained above, a tube lens 32, a mirror 33, a relay lens 34, a tube lens 35, and an eyepiece 36.

The tube lens 32, the mirror 33, and the relay lens 34 are attached in an inside of the microscope main body 1, and an observation light which becomes a parallel light beam by passing through the objective lens 31 is made into an image by passing through the tube lens 32 and enters the lens-barrel 8 by way of the mirror 33 and the relay lens 34.

The tube lens 35 and the eyepiece 36 are attached in an inside of the lens-barrel 8, and an observation light having entered from the microscope main body 1 is made into an image by passing through the tube lens 35 and observed when seen through the eyepiece 36.

The inverted microscope shown in FIGS. 1 and 2 is provided with a transmissive illumination device 9. The transmissive illumination device 9 is attached in an area above the microscope main body 1. The transmissive illumination device 9 is provided with a supporting post 91, a light source 92 attached to the supporting post 91, a floodlight tube 93 attached to the supporting post 91, and a condenser lens 94 attached to the supporting post 91.

In the inverted microscope according to the first embodiment explained above, the convex part 4a provided in the optical device 4 is inserted to the fitting grooves 1b1 and 1c1 provided in the microscope main body 1 in attaching the optical device 4 in the attachment area. The convex part 4a provided in the optical device 4 is guided to the fitting grooves 1b1 and 1c1 provided in the microscope main body 1, and the optical device 4 is attached to the microscope main body 1. Then, the attached optical device 4 is positioned by the convex part 4a and the fitting grooves 1b1 and 1c1 and fixed.

Next, a convex part 5a provided in the light source 5 is inserted to the fitting hole 1b2 provided in the microscope main body 1. The convex part 5a provided in the light source 5 is guided to the fitting hole 1b2 provided in the microscope main body 1, and the light source 5 is attached to the microscope main body 1. Then, the attached light source 5 is positioned by the convex part 5a and the fitting hole 1b2 and fixed.

The microscope main body 1 of the inverted microscope according to the first embodiment explained above is provided with the beam part 1d connecting the upper part of the back wall part 1b and the upper part of the front wall part 1c, the attachment area of the optical device 4 is formed in the lower side area of the beam part 1d, and the attachment area of the objective lens 31 is formed in the upper side area thereof. Since the beam part 1d locates between the tube lens 32 and the objective lens 31 and connects the back wall part 1b and the front wall part 1c in pairs at the front and the back sides together, the microscope main body 1 becomes of superiority in rigidity. Besides, since the focusing device 7 is arranged in the vicinity of the stage 2 irrespective of the number of attached optical devices 4, it is possible to reduce the size and be of superiority in rigidity.

While the back wall part 1b and the front wall part 1c are configured as supporting parts that support the stage 2 in the microscope main body according to the first embodiment explained above, the supporting parts are not limited to such wall bodies as the back wall part 1b and the front wall part 1c and may be supporting posts (not shown) as long as they support the stage 2 in pairs at the front and the back sides.

While the focusing device 7 is attached on the upper surface of the beam part 1d, it is only necessary to attach at least a part of the focusing device 7 to the beam part 1d or the stage supporting parts (the back wall part 1b or the front wall part 1c).

Second Embodiment

Figure 3A:
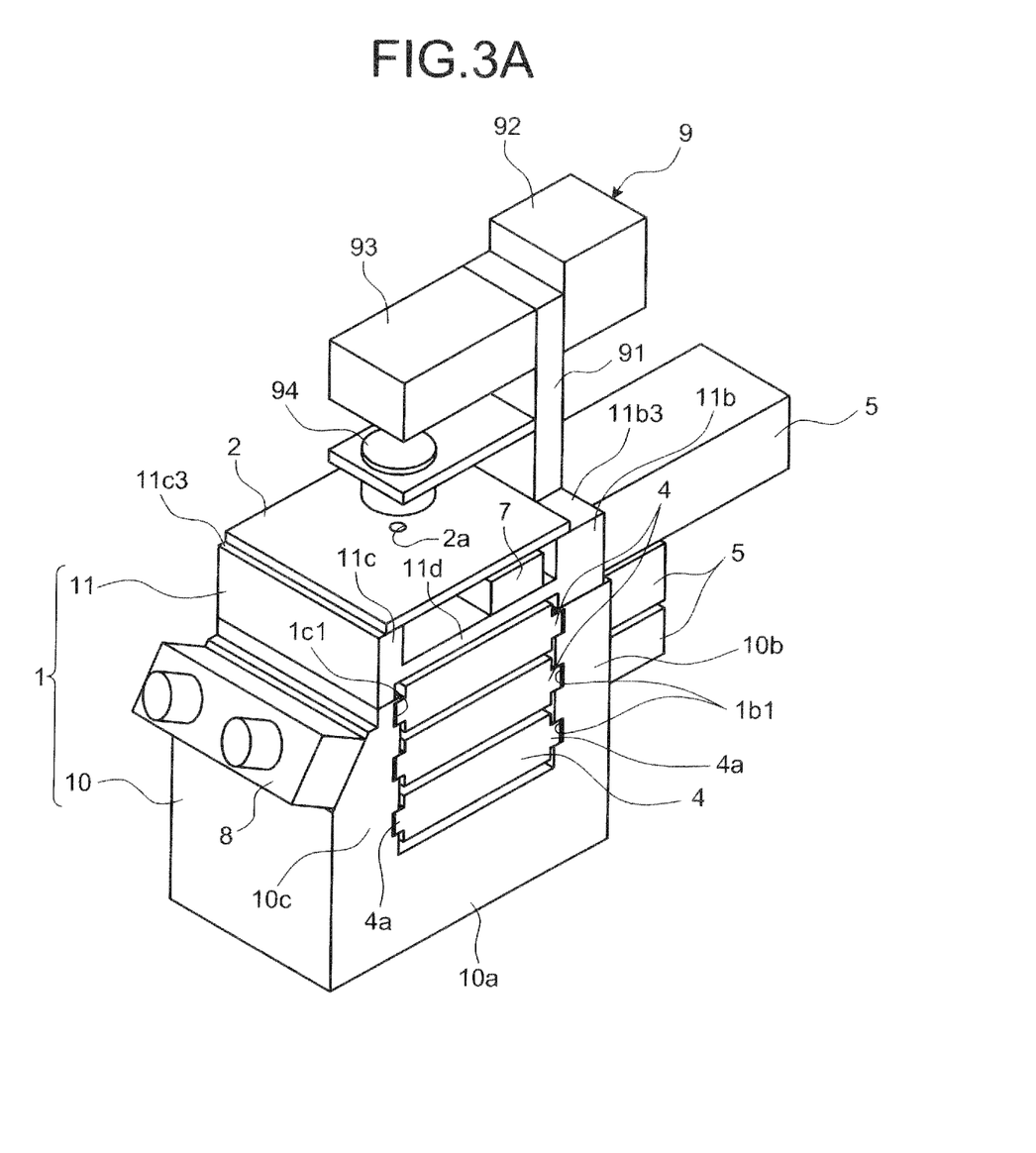
FIG. 3A is a conceptual perspective view of an inverted microscope according to a second embodiment of the present invention, showing a state where an upper part structure is slid and adjusted forward.
Figure 3B:
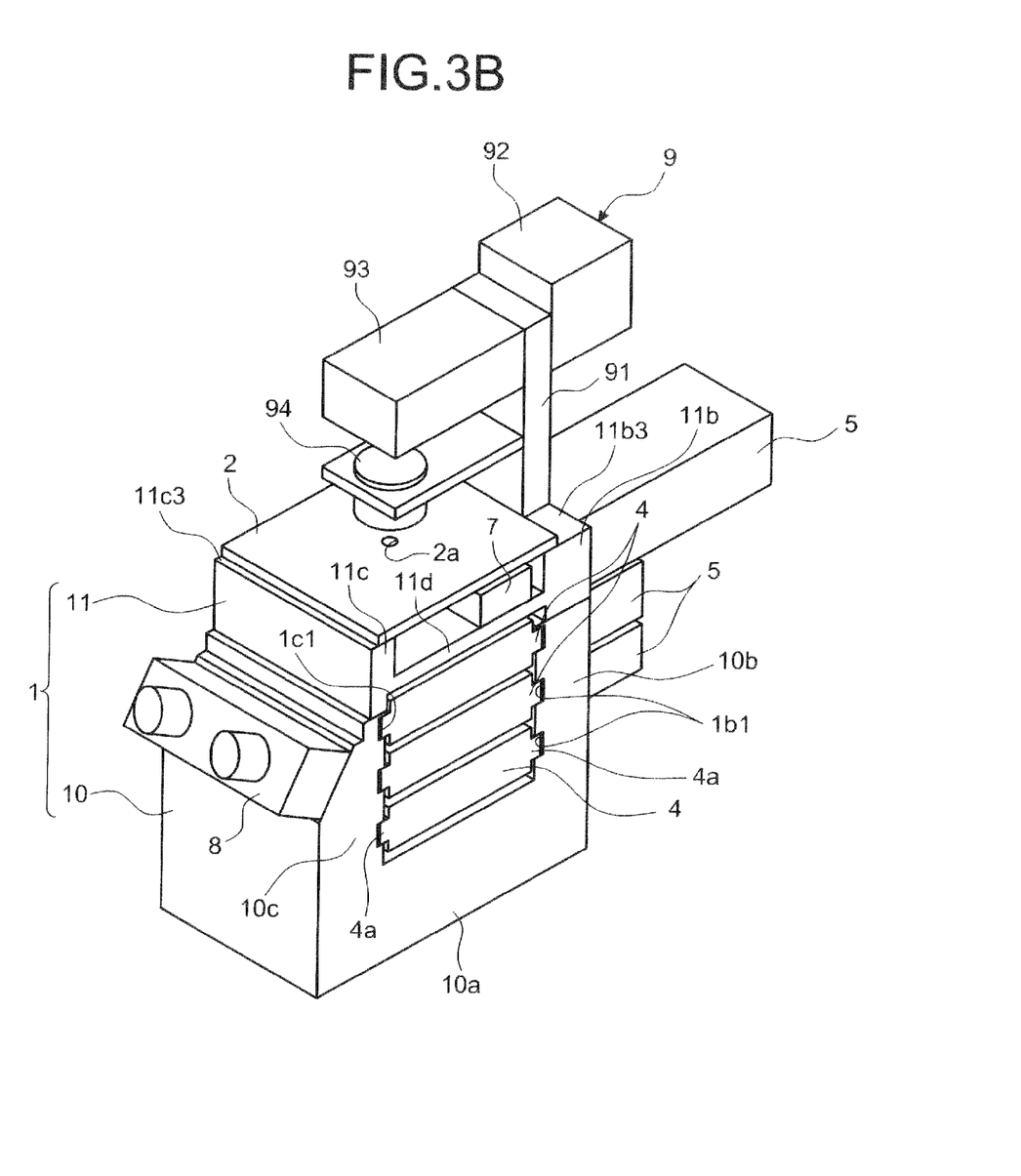
FIG. 3B is a conceptual perspective view of the inverted microscope according to the second embodiment of the present invention, showing a state where the upper part structure is slid and adjusted backward.
Figure 4:
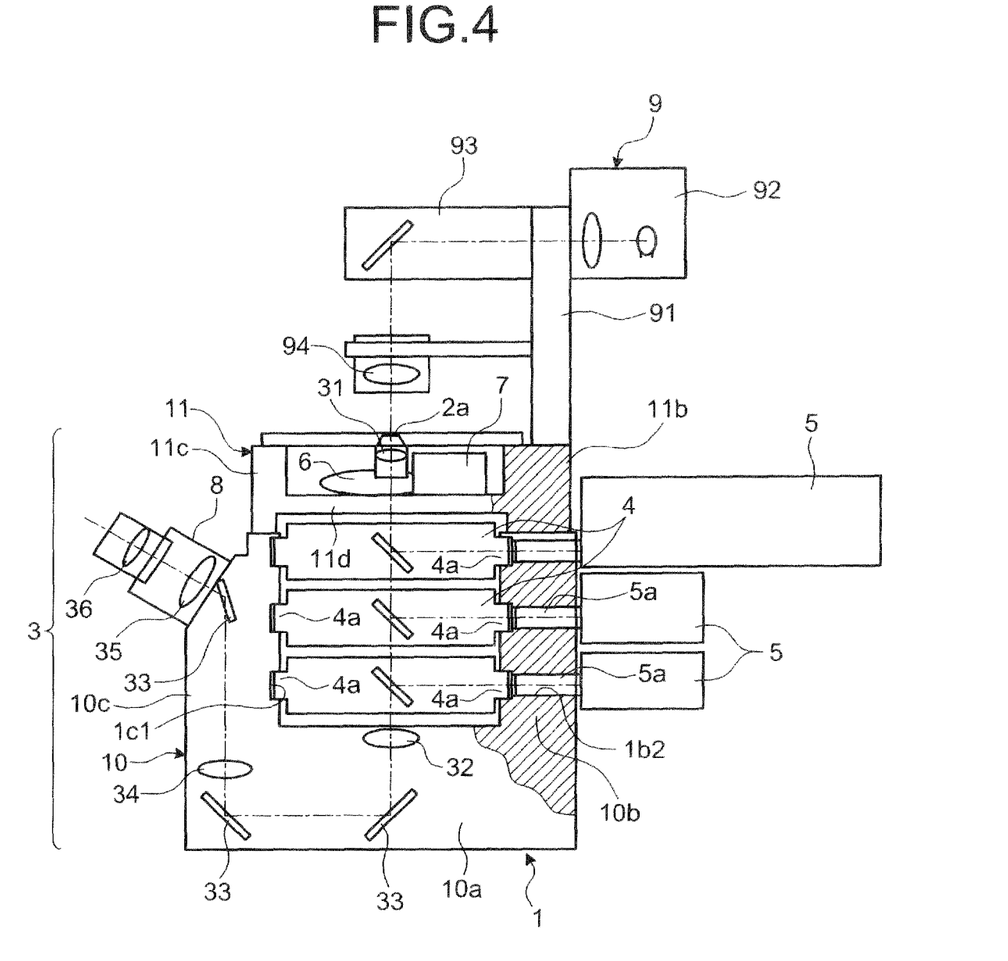
FIG. 4 is a cross sectional view of an inner structure of the inverted microscope shown in FIG. 3.
Figure 5:
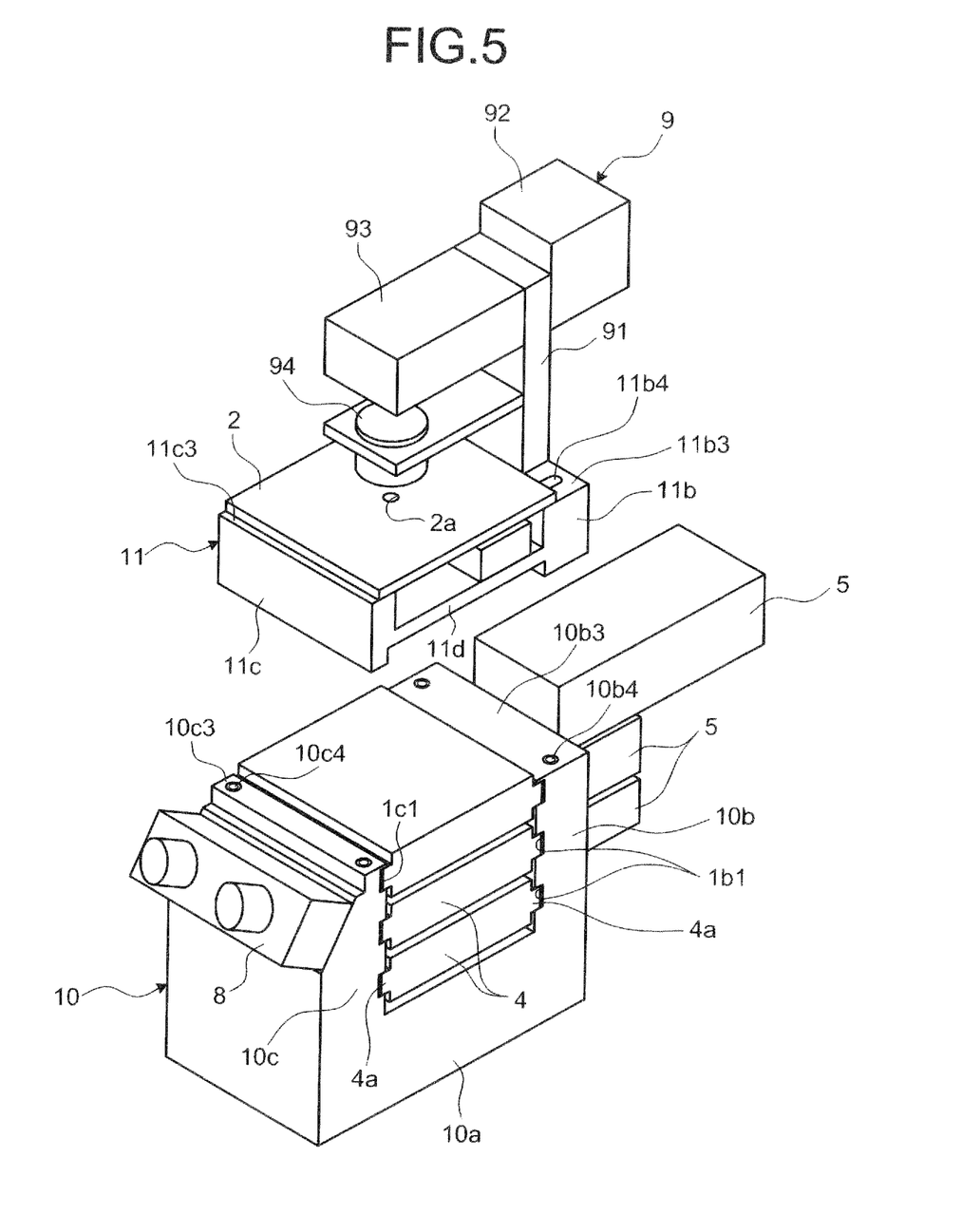
FIG. 5 is an exploded perspective view of the structure of the inverted microscope shown in FIG. 3.

FIG. 3 is a conceptual perspective view of an inverted microscope according to a second embodiment of the present invention, FIG. 3A shows a state where an upper part structure is slid and adjusted forward, and FIG. 3B shows state where the upper part structure is slid and adjusted backward. FIG. 4 is a cross sectional view of an inner structure of the inverted microscope shown in FIG. 3 and FIG. 5 is an exploded perspective view of the structure of the inverted microscope shown in FIG. 3.

The inverted microscope according to the second embodiment has no other difference from the inverted microscope according to the first embodiment than a configuration that the microscope main body 1 is constituted by a lower part structure 10 and an upper part structure 11. Therefore, the microscope main body 1 will be explained, the same component as the inverted microscope according to the first embodiment will be assigned with the same reference sign, and the explanation of the same component will be omitted.

Figure 6:
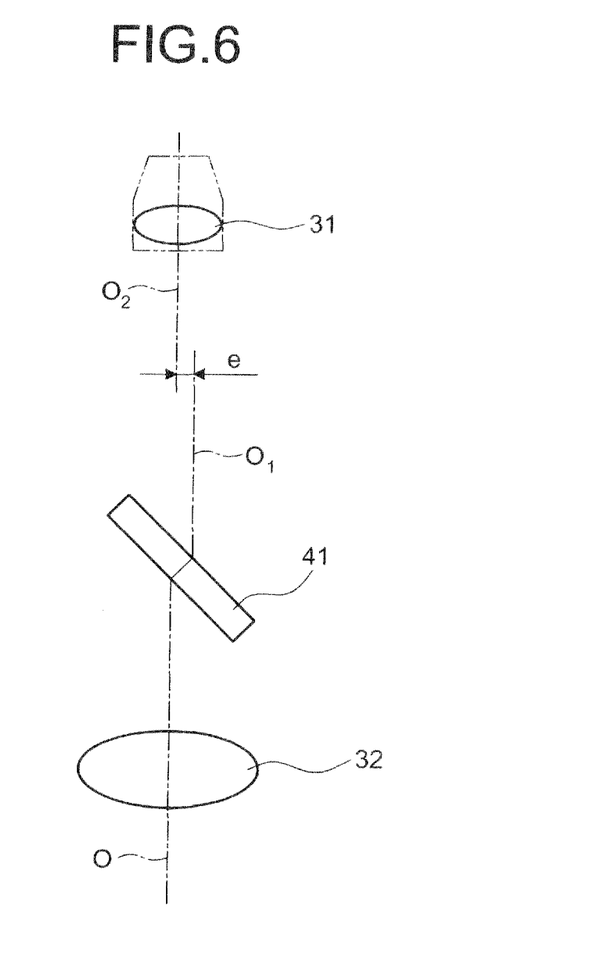
FIG. 6 is a view explaining a reason why an optical axis deviates.

As shown in FIG. 6, when the optical device 4 is attached between the objective lens 31 and the tube lens 32 in the inverted microscope according to the first embodiment explained above, a light is refracted in passing through a mirror 41 embedded in the optical device 4 and an optical axis O deviates backward. Especially in a case where a plurality of optical devices 4 are attached between the objective lens 31 and the tube lens 32 or a case where the mirror 41 embedded in the optical device 4 is thick, the optical axis O deviates backward significantly.

The inverted microscope according to the second embodiment is configured to enable an optical axis $O_2$ of the objective lens 31 to be slid and adjusted in the front-back direction so that an optical axis $O_1$ of the attached optical device 4 and the optical axis $O_2$ of the objective lens 31 match (see FIGS. 3A and 3B), and the microscope main body 1 of the inverted microscope according to the second embodiment is constituted by the lower part structure (supporting part main body) 10 and the upper part structure (sliding body) 11 as explained above.

As shown in FIGS. 3 and 4, the lower part structure 10 forms a lower part of the microscope main body 1 and includes a base part 10a that extends in the front-back direction, a back wall lower part 10b that extends upward from a back edge part of the base part 10a, and a front wall lower part 10c that extends upward from a front edge part of the base part 10a. An upper surface 10b3 (see FIG. 5) of the back wall lower part 10b and an upper surface 10c3 (see FIG. 5) of the front wall lower part 10c form the same planar surface running in the horizontal direction, and the upper part structure 11 is attached over the upper surface 10b3 of the back wall lower part 10b and the upper surface 10c3 of the front wall lower part 10c.

The upper part structure 11 forms an upper part of the microscope main body 1 and is attached on top of the lower part structure 10. The upper part structure 11 includes a back wall upper part 11b that extends upward from the back wall lower part 10b of the lower part structure 10, a front wall upper part 11c that extends upward from the front wall lower part 10c of the lower part structure 10 when attached to the lower part structure 10, and a beam part 11d that connects the back wall upper part 11b and the front wall upper part 11c approximately at a center in a height direction. An upper surface 11b3 of the back wall upper part 11b and an upper surface 11c3 of the front wall upper part 11c form the same planar surface running in the horizontal direction, and the stage 2 is attached over the upper surface 11b3 of the back wall upper part 11b and the upper surface 11c3 of the front wall upper part 11c.

As shown in FIG. 5, the upper part structure 11 explained above is fixed to the lower part structure 10 by tightening screws 12 (see FIG. 8) inserted through long holes 11b4 and 11c4 (see FIG. 8) provided in the upper part structure 11 with internal threads 10b4 and 10c4 provided in the lower part structure. Here, a click mechanism or an abutting surface for positioning (not shown) may be provided between the lower part structure 10 and the upper part structure 11 and the upper part structure 11 may be positioned at a predetermined position when no optical device 4 is attached or depending on the number of optical devices 4.

The revolver 6 and the focusing device 7 are attached on the upper surface of the beam part 11d of the upper part structure 11. Therefore, when the upper part structure 11 is detached from the lower part structure 10, the revolver 6 and the focusing device 7 are detached together with the upper part structure 11. When the screws 12 are loosened and the upper part structure is shifted with respect to the lower part structure 10, the revolver 6 and the focusing device 7 are shifted together with the upper part structure 11.

The transmissive illumination device 9 is attached to the back wall upper part 11b of the upper part structure 11. Therefore, when the upper part structure 11 is detached from the lower part structure 10, the transmissive illumination device 9 is detached together with the upper part structure 11. When the screws 12 are loosened and the upper part structure is shifted with respect to the lower part structure 10, the transmissive illumination device 9 is shifted together with the upper part structure 11.

In making an adjustment so that the optical axis $O_1$ of the attached optical device 4 and the optical axis $O_2$ of the objective lens 31 match in the inverted microscope according to the embodiment explained above, the screws fixing the upper part structure 11 to the lower part structure 10 are loosened and the upper part structure 11 is shifted so that the optical axis $O_1$ of the attached optical device 4 and the optical axis $O_2$ of the objective lens 31 match (see FIGS. 3A and 3B). After that, the upper part structure 11 is fixed to the lower part structure 10 by tightening the screws.

Since the microscope main body 1 of the inverted microscope according to the second embodiment explained above is provided with the lower part structure 10 and the upper part structure 11 attached to the lower part structure 10, and the upper part structure 11 can be shifted with respect to the lower part structure 10, it is possible to make an adjustment so that the optical axis $O_1$ of the optical device 4 attached to the lower part structure 10 and the optical axis $O_2$ of the objective lens 31 attached to the revolver 6 match.

Since the revolver 6 and the focusing device 7 are attached to the upper surface of the beam part 11d of the upper part structure 11 and also the transmissive illumination device 9 is attached to the back wall upper part 11b of the upper part structure 11, no deviation would be generated, even when the upper part structure 11 is shifted with respect to the lower part structure 10, between the optical axis of the transmissive illumination device 9 and the optical axis of the objective lens 31 attached to the revolver 6 by making the adjustment so that the optical axis of the transmissive illumination device 9 and the optical axis of the objective lens 31 attached to the revolver 6 match, enabling in a highly reliable measurement.

Third Embodiment

Figure 7:
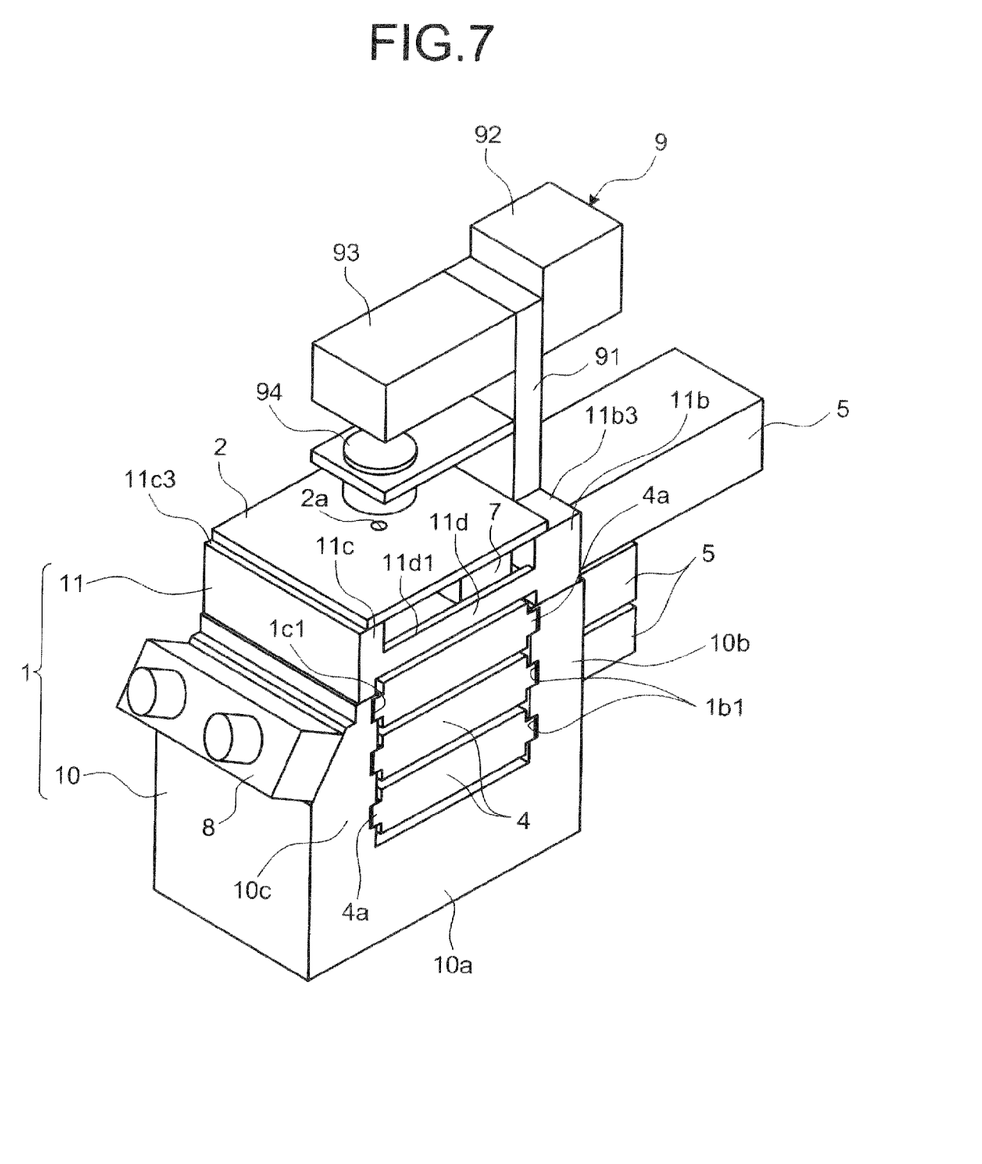
FIG. 7 is a conceptual perspective view of an inverted microscope according to a third embodiment of the present invention.
Figure 8:
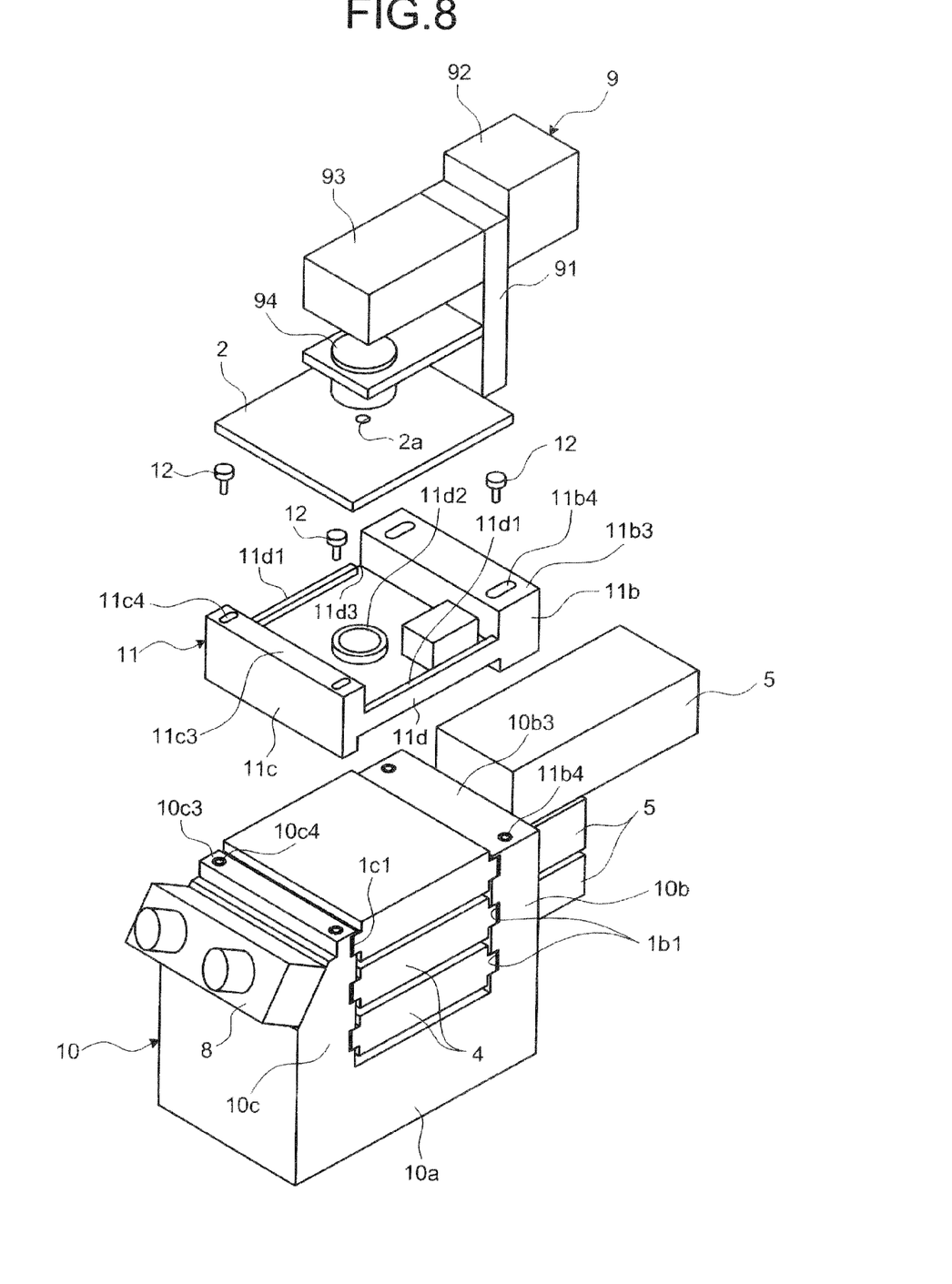
FIG. 8 is an exploded perspective view of a structure of the inverted microscope shown in FIG. 7.

FIG. 7 is a conceptual perspective view of an inverted microscope according to an embodiment of the present invention and FIG. 8 is an exploded perspective view of a structure of the inverted microscope shown in FIG. 7.

The inverted microscope according to the third embodiment has no other difference from the inverted microscope according to the second embodiment than a configuration that edge parts 11d1 and 11d2 are provided on the upper surface of the beam part 11d. Therefore, the beam part 11d will be explained, the same component as the second embodiment will be assigned with the same reference sign, and the explanation of the same component will be omitted.

The inverted microscope tends to be contaminated in a lower side area of the stage 2 due to a dripping of oil used for an oil immersion objective lens, solvent dissolving the sample, liquid used for managing temperature or humidity, and the like from the stage 2.

The beam part 11d of the inverted microscope according to the third embodiment has a size to cover an entire area of the upper surface of the attached optical device 4 and receives once the oil, the solvent, the liquid, and the like dripping from the stage 2 by the upper surface. Besides, an edge part 11d1 protruding upward is formed at both edge parts on the upper surface of the beam part 11d and surrounds an outer periphery of the upper surface of the beam part 11d together with the back wall upper part 11b and the front wall upper part 11c. Around the open hole through which an observation light is transmitted, an edge part 11d2 protruding upward is formed and surrounds the open hole. These edge parts 11d1 and 11d2 prevent the oil, the solvent, the liquid, and the like received by the upper surface of the beam part 11d once from irregularly running down from an edge part at the upper surface side of the beam part 11d. Besides, a cutout 11d3 is provided at a part of the edge part 11d1 and allows the oil, the solvent, the liquid, and the like collected on the upper surface of the beam part 11d to run out to the outside from the cutout 11d3.

Since the beam part 11d of the inverted microscope according to the third embodiment covers an entire area of the upper surface of the attached optical device 4 and the dripping of the oil, the solvent, the liquid, and the like from the stage 2 is received by the beam part 11d, it is possible to prevent a contamination of the attached optical device 4. In addition, since the received oil, solvent, liquid, and the like are run out from the cutout 11d3 provided in the outer periphery of the upper surface of the beam part 11d, there is no chance of leaking from the edge parts 11d1 and 11d2 and contaminating the attached optical device 4.

Fourth Embodiment

Figure 9:
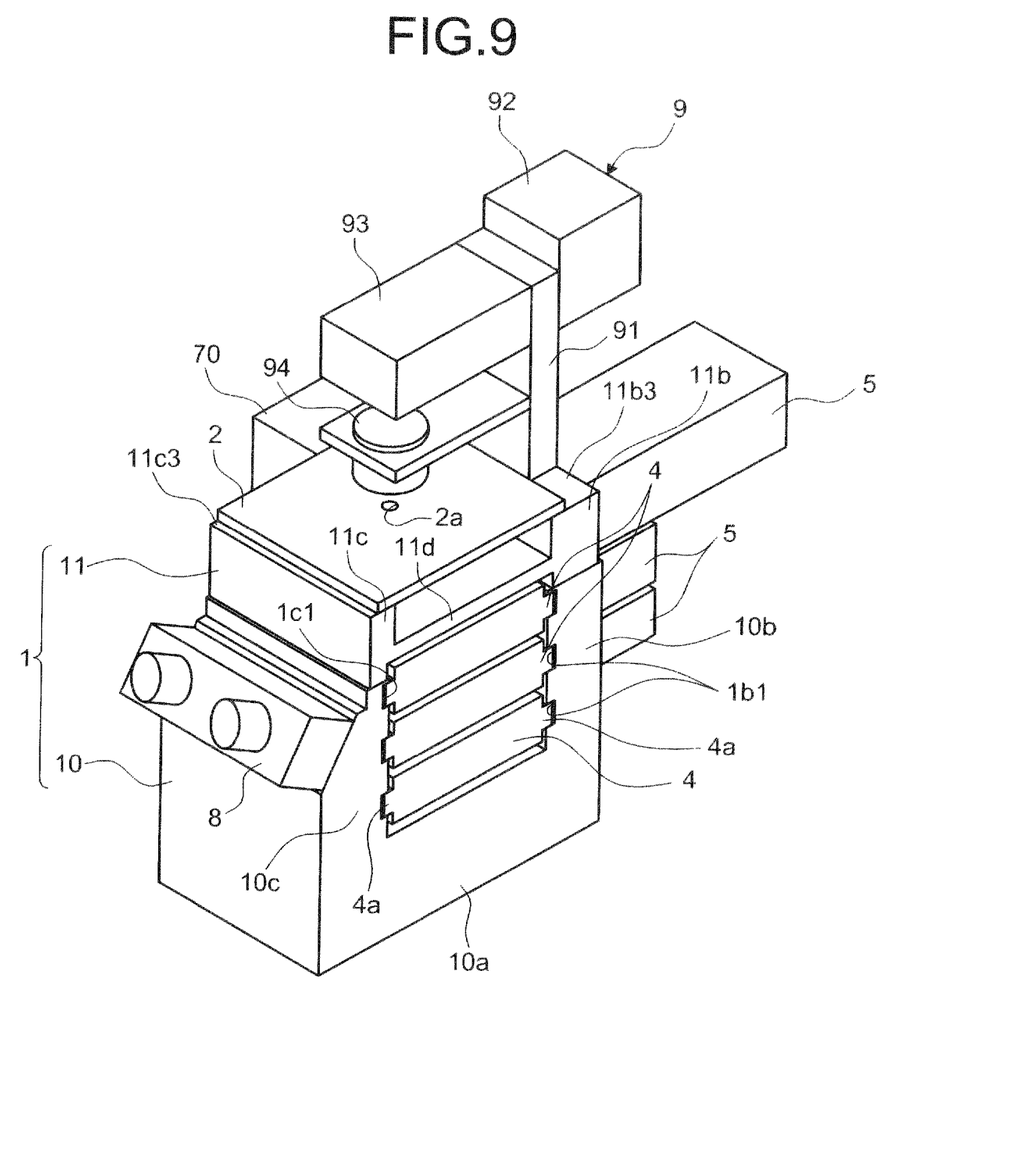
FIG. 9 is a conceptual perspective view of an inverted microscope according to a fourth embodiment of the present invention.

FIG. 9 is a conceptual perspective view of an inverted microscope according to a fourth embodiment of the present invention. The inverted microscope according to the fourth embodiment has no other difference from the inverted microscope according to the second embodiment than a configuration that the focusing device 7 is configured by an autofocusing device 70. Therefore, the same component as the inverted microscope according to the second embodiment will be assigned with the same reference sign and the explanation of the same component will be omitted.

As shown in FIG. 9, the focusing device 7 is configured by the autofocusing device 70 in the inverted microscope according to the fourth embodiment of the present invention. The autofocusing device 70 automatically focuses the objective lens 31 and is provided with a light source, a lens, and an optical receiver. The autofocusing device is, for example, adopts an active method, detects a reflection light from the sample placed on the stage or from a bottom surface of a sample container, and automatically focuses the objective lens 31.

Since the focusing device 7 is configured by the autofocusing device 70 in the inverted microscope according to the fourth embodiment, the objective lens 31 is automatically focused and a focusing operation becomes easy.

Since a microscope main body, in which an optical device can be attached between an objective lens and a tube lens constituting an observation optical system, of an inverted microscope according to the present invention includes a plurality of stage supporting parts that support a stage and a beam part that connects, in a manner of locating between the tube lens and the objective lens, at least a pair of stage supporting parts at front and back sides together among the plurality of stage supporting parts, it is possible to provide an inverted microscope in which the optical device can be attached to the observation optical system from the objective lens to the tube lens and which is low in cost and of superiority in rigidity.

Since the stage supporting parts of the inverted microscope according to the present invention include a supporting part main body and a sliding body which is formed together with the supporting part main body and the beam part and attached to the supporting part main body so that sliding can be adjusted, it is possible to make an adjustment so that an optical axis of the attached optical device and an optical axis of the objective lens match.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inverted microscope, comprising:
a microscope main body;
a stage which is supported by the microscope main body; and
an observation optical system which allows observation of a sample placed on the stage from underneath, and which comprises an objective lens and a tube lens;
wherein the microscope main body is adapted to receive therein an optical device which is detachably attachable between the objective lens and the tube lens of the observation optical system;
wherein the microscope main body includes:
a plurality of stage supporting parts which support the stage, and which comprise at least a pair of stage supporting parts provided respectively at opposing first and second sides of the microscope main body;
a beam part which is arranged between the tube lens and the objective lens, and which connects at least said pair of stage supporting parts together among the plurality of stage supporting parts;
an attachment area which is provided in a lower side area of the beam part and which is adapted to have the optical device attached thereto; and
a pair of fitting grooves which are provided in the attachment area at said opposing first and second sides of the microscope main body, and which are adapted to have the optical device attached therein.

2. The inverted microscope according to claim 1, further comprising a focusing device at least a part of which is attached to one of the stage supporting parts and the beam part, and which is adapted to shift the objective lens to an optical axis direction.

3. The inverted microscope according to claim 2, wherein the focusing device is an autofocusing device which is adapted to detect a reflection light from one of the sample and a sample container and to focus the objective lens.

4. The inverted microscope according to claim 1, wherein the stage supporting parts include:
a supporting part main body; and
a sliding body which is formed together with the beam part and which is attached to the supporting part main body in a manner enabling a sliding adjustment so that an optical axis of the attached optical device and an optical axis of the objective lens match.

5. The inverted microscope according to claim 2, wherein the stage supporting parts include:
a supporting part main body; and
a sliding body which is formed together with the beam part and which is attached to the supporting part main body in a manner enabling a sliding adjustment so that an optical axis of the attached optical device and an optical axis of the objective lens match.

6. The inverted microscope according to claim 3, wherein the stage supporting parts include:
a supporting part main body; and
a sliding body which is formed together with the beam part and which is attached to the supporting part main body in a manner enabling a sliding adjustment so that an optical axis of the attached optical device and an optical axis of the objective lens match.

7. The inverted microscope according to claim 1, wherein the beam part has a size adapted to cover an entire area of an upper surface of the attached optical device, and has an edge part protruding upward in at least a part of an outer periphery of an upper surface of the beam part.

8. The inverted microscope according to claim 2, wherein the beam part has a size adapted to cover an entire area of an upper surface of the attached optical device, and has an edge part protruding upward in at least a part of an outer periphery of an upper surface of the beam part.

9. The inverted microscope according to claim 3, wherein the beam part has a size adapted to cover an entire area of an upper surface of the attached optical device, and has an edge part protruding upward in at least a part of an outer periphery of an upper surface of the beam part.

10. The inverted microscope according to claim 4, wherein the beam part has a size adapted to cover an entire area of an upper surface of the attached optical device, and has an edge part protruding upward in at least a part of an outer periphery of an upper surface of the beam part.

11. The inverted microscope according to claim 5, wherein the beam part has a size adapted to cover an entire area of an upper surface of the attached optical device, and has an edge part protruding upward in at least a part of an outer periphery of an upper surface of the beam part.

12. The inverted microscope according to claim 6, wherein the beam part has a size adapted to cover an entire area of an upper surface of the attached optical device, and has an edge part protruding upward in at least a part of an outer periphery of an upper surface of the beam part.

13. The inverted microscope according to claim 1, wherein the microscope main body includes:
 a lower part structure to which the tube lens is attached and which is adapted to have the optical device attached thereto; and
 an upper part structure in which the plurality of stage supporting parts and the beam part are integrally formed and which is attached to the lower part structure in a manner enabling a sliding adjustment so that an optical axis of the attached optical device and an optical axis of the objective lens match.

14. The inverted microscope according to claim 2, wherein the microscope main body includes:
 a lower part structure to which the tube lens is attached and which is adapted to have the optical device attached thereto; and
 an upper part structure in which the plurality of stage supporting parts and the beam part are integrally formed and which is attached to the lower part structure in a manner enabling a sliding adjustment so that an optical axis of the attached optical device and an optical axis of the objective lens match.

15. The inverted microscope according to claim 3, wherein the microscope main body includes:
 a lower part structure to which the tube lens is attached and which is adapted to have the optical device attached thereto; and
 an upper part structure in which the plurality of stage supporting parts and the beam part are integrally formed and which is attached to the lower part structure in a manner enabling a sliding adjustment so that an optical axis of the attached optical device and an optical axis of the objective lens match.

16. The inverted microscope according to claim 13, wherein the beam part has a size adapted to cover an entire area of an upper surface of the attached optical device, and has an edge part protruding upward in at least a part of an outer periphery of an upper surface of the beam part.

17. The inverted microscope according to claim 14, wherein the beam part has a size adapted to cover an entire area of an upper surface of the attached optical device, and has an edge part protruding upward in at least a part of an outer periphery of an upper surface of the beam part.

18. The inverted microscope according to claim 15, wherein the beam part has a size adapted to cover an entire area of an upper surface of the attached optical device, and has an edge part protruding upward in at least a part of an outer periphery of an upper surface of the beam part.

* * * * *